(12) United States Patent
Yamakawa et al.

(10) Patent No.: US 8,184,334 B2
(45) Date of Patent: May 22, 2012

(54) IMAGE PROCESSING APPARATUS AND IMAGE PROCESSING METHOD FOR THE SAME

(75) Inventors: Junichi Yamakawa, Kawasaki (JP); Hideaki Kurihara, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1202 days.

(21) Appl. No.: 11/135,096

(22) Filed: May 23, 2005

(65) Prior Publication Data

US 2005/0270587 A1    Dec. 8, 2005

(30) Foreign Application Priority Data

May 24, 2004    (JP) ................................. 2004-153371

(51) Int. Cl.
*G06F 15/00* (2006.01)
*H04N 3/10* (2006.01)

(52) U.S. Cl. ......... 358/1.9; 358/518; 345/604; 345/589; 345/600

(58) Field of Classification Search .................. 358/1.9, 358/518, 448, 1.15; 345/604, 589, 600
See application file for complete search history.

(56) References Cited

U.S. PATENT DOCUMENTS

| | | | |
|---|---|---|---|
| 5,646,752 A |  | 7/1997 | Kohler et al. |
| 6,636,260 B2 * | 10/2003 | Kiyokawa ................. 348/222.1 |
| 7,030,888 B1 * | 4/2006 | Edge et al. ..................... 345/604 |
| 7,382,379 B1 * | 6/2008 | Edge et al. ..................... 345/600 |

| | | | |
|---|---|---|---|
| 2003/0193688 A1 * | 10/2003 | Namikata ..................... 358/1.15 |
| 2003/0234793 A1 * | 12/2003 | Stokes et al. .................. 345/600 |
| 2004/0001229 A1 | 1/2004 | Hangu |
| 2004/0004731 A1 * | 1/2004 | Itagaki .......................... 358/1.9 |
| 2004/0213614 A1 * | 10/2004 | Uchida ........................... 400/62 |

FOREIGN PATENT DOCUMENTS

| | | |
|---|---|---|
| JP | 09-181908 A | 7/1997 |
| JP | 10-228146 A | 8/1998 |
| JP | 2003-058354 A | 2/2003 |
| JP | 2003058354 A  * | 2/2003 |
| JP | 2003-145842 A | 5/2003 |
| JP | 2004-64565 A | 2/2004 |
| JP | 2004-088734 A | 3/2004 |
| JP | 2004-140627 A | 5/2004 |

OTHER PUBLICATIONS

Imation Matchprint Professional Server User Guide http://download.support.xerox.com/pub/docs/DocuColor_12CP/userdocs/any-os/en/Matchprint_Prof_Setting_2x_Job_Parameters_Guide.pdf (2001).*

Alwan LinkProfiler Manual www.impressed.de/t/PDFs/Link_Profiler/LinkProfiler_manual.pdf (May 18, 2004).*

* cited by examiner

*Primary Examiner* — Chan Park
*Assistant Examiner* — Huo Long Chen
(74) *Attorney, Agent, or Firm* — Canon U.S.A., Inc., IP Division (57) ABSTRACT

An image processing apparatus for using one of a device link profile and a set of a source profile and an output profile includes a first selection unit for selecting a set of a source profile and an output profile and second selection unit for selecting a device link profile. In the image processing apparatus, the device link profile and the set of a source profile and an output profile are exclusively selected such that only one of the device link profile and the set of a source profile and an output profile is selected at a time.

4 Claims, 10 Drawing Sheets

IMAGE PROCESSING APPARATUS AND IMAGE PROCESSING METHOD FOR THE SAME

BACKGROUND OF THE INVENTION

1. Field of the Invention

The present invention relates to an image forming apparatus and an image processing method for an image forming apparatus using a color profile.

2. Description of the Related Art

Figure 1:
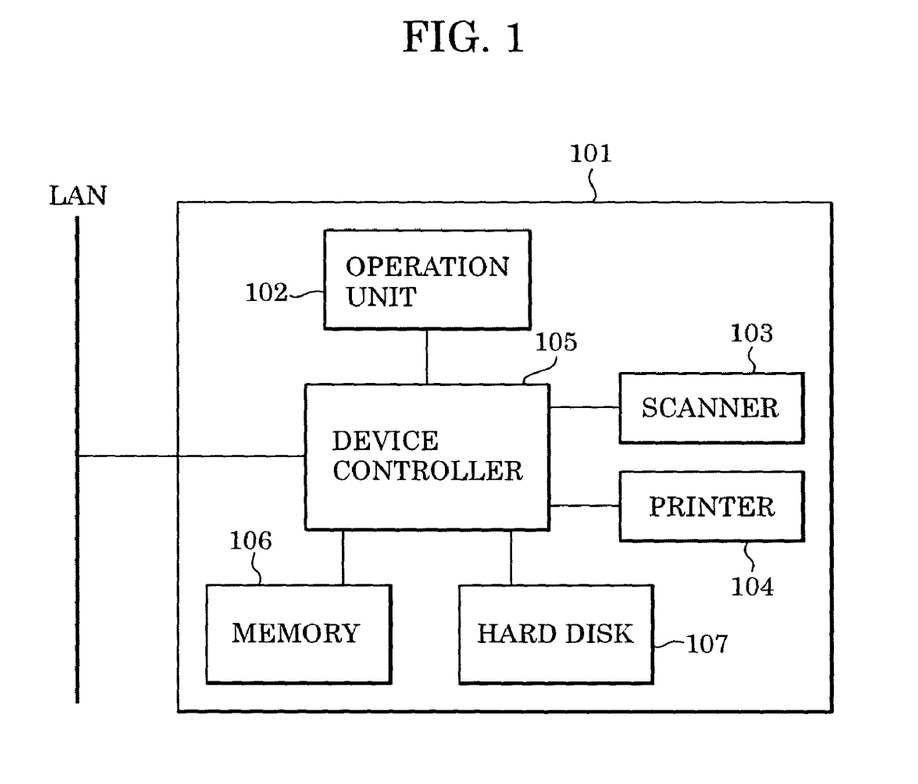
FIG. 1 is a block diagram illustrating the configuration of an image forming apparatus.

Multi-function digital copiers, such as a multi-function digital copier 101 shown in FIG. 1, are known as image forming apparatuses for inputting and outputting images. The multi-function digital copier 101 can carry out multi-functional image processing using a copy function, a printer function, and a facsimile function.

FIG. 1 is a block diagram illustrating the system configuration of such an image forming apparatus. This full-color multi-function digital copier includes a scanner 103 for scanning a document image recorded on, for example, paper and a printer 104 for outputting a scanned image or an image transferred from a host computer on a medium, such as paper. The full-color multi-function digital copier further includes a device controller 105 for controlling the operations of the scanner 103 and the printer 104 and carrying out a variety of image processing, an operation unit 102 for allowing a user to operate the apparatus, and a memory 106 and a hard disk 107 for temporarily or permanently storing image data and a processing program.

Such a full-color multi-function digital copier can not only copy a document image but can also carry out a variety of image processing while copying. For example, the full-color multi-function digital copier can provide various image processing operations, such as a negative to positive image conversion function that converts black to white and white to black in a document, a trimming function that copies only part of a document, and a reduced layout function that reduces a plurality of documents and combines them onto one output sheet of paper.

Additionally, an image forming system is proposed in which the image forming apparatus is connected to a host computer via a controller and a color image created by the host computer is converted into a rasterized image by the controller to be stored in a memory in the controller. Then, the image is printed by the image forming apparatus functioning as a color laser printer.

When the image is rasterized, the image is subjected to various processes, such as a sharpness filtering process, a trapping process, an overprinting process, and a color process. In particular, in terms of a color process, a color conversion system using a color profile, which describes color reproduction characteristics of paper and a print device, is commercially available, since reproduced color significantly depends on the type of color material, such as toner, and the transfer medium, such as paper.

Color conversion techniques using a color profile have been proposed, for example, as disclosed in Japanese Patent Laid-Open No. 2004-64565. In this color conversion technique, ICC profiles defined by the ICC (International Color Consortium) are generally used. In particular, a technique using two profiles among the ICC profiles, namely, a source profile and an output profile, is widely used. The source profile describes the color characteristic of an input device and the output profile describes the color characteristic of an output device. A system using the source profile and output profile converts input data to a device-independent color space (PCS: Profile Connection Space) while referencing the source profile, and then converts the data to optimum color data for an output device while referencing the output profile.

Additionally, a device link profile is defined as another ICC profile. The device link profile holds a conversion table for directly converting input data to output data without using the PCS. Therefore, color conversion from input data to output data is carried out by referencing only one device link profile.

In a color conversion system of an image processing apparatus of commonly used color printers, the techniques using a source profile and an output profile are common. However, the types of color profiles initially installed in the image processing apparatus are limited. Therefore, some apparatuses allow a source profile and an output profile to be externally installed. Also, since creating a device link profile requires both a source profile and an output profile, some apparatuses can internally create a device link profile from a combination of a source profile and an output profile in the image processing apparatus.

Furthermore, some apparatuses implement a graphical user interface (GUI) in a printer driver in order to provide users with a user-friendly color processing path using a source profile and an output profile.

However, the printing process of known image forming apparatuses causes the problems described next.

Some known printers allow a source profile and an output profile to be externally installed and allow color processing via the PCS by selecting a source profile and an output profile at color processing time. On the other hand, a device link profile is created from a source profile and an output profile installed in the image processing apparatus.

This color conversion using a device link profile only provides the same effect as color conversion using a source profile and an output profile. In addition, some known apparatuses include a printer driver implementing a GUI that allows users to easily understand the color processing path using a source profile and an output profile. The color processing path is information as to which source profile should be used to convert data to image data of the PCS (profile connection space) and which output profile should be applied to the converted image data.

However, no known technology mentions an image processing apparatus allowing a user to install color processing tables (i.e., device link profiles) that have more features provided by tools of third vendors other than the vendor of the image processing apparatus so as to allow a color conversion processing using a variety of device link profiles, let alone an environment in which a plurality of device link profiles can be installed in an image processing apparatus and users can select an appropriate device link profile. Furthermore, no known image processing apparatus can notify a user of a color processing path in the case of using a device link profile created from a source profile and an output profile. Accordingly, it is more difficult for a user to master how to execute color settings using a device link profile compared to the widely used settings using a source profile and an output profile. Thus, an improved method of setting up such a system is required.

SUMMARY OF THE INVENTION

The present invention provides an image processing method and apparatus for achieving improved operability when operating a plurality of device link profiles.

According to an aspect of the present invention, an image processing apparatus for using one of a device link profile and a set of a source profile and an output profile includes a first selection unit configured to select the set of a source profile and an output profile, and a second selection unit configured to select the device link profile. The device link profile and the set of a source profile and an output profile are exclusively selected such that only one of the device link profile and the set of a source profile and an output profile is selected at a time.

The present invention also provides an image processing method and apparatus for allowing properties of a device link profile to be easily viewed.

According to another aspect of the present invention, an image processing apparatus includes a display unit configured to displaying a plurality of device link profiles, an instruction unit configured to instruct a display of properties of the plurality of the device link profiles displayed by the display unit, and a property display unit configured to display the properties in response to the instruction of the instruction unit.

Further features and advantages of the present invention will become apparent from the following description of exemplary embodiments with reference to the attached drawings.

DESCRIPTION OF THE EMBODIMENTS

First Embodiment

Figure 2:
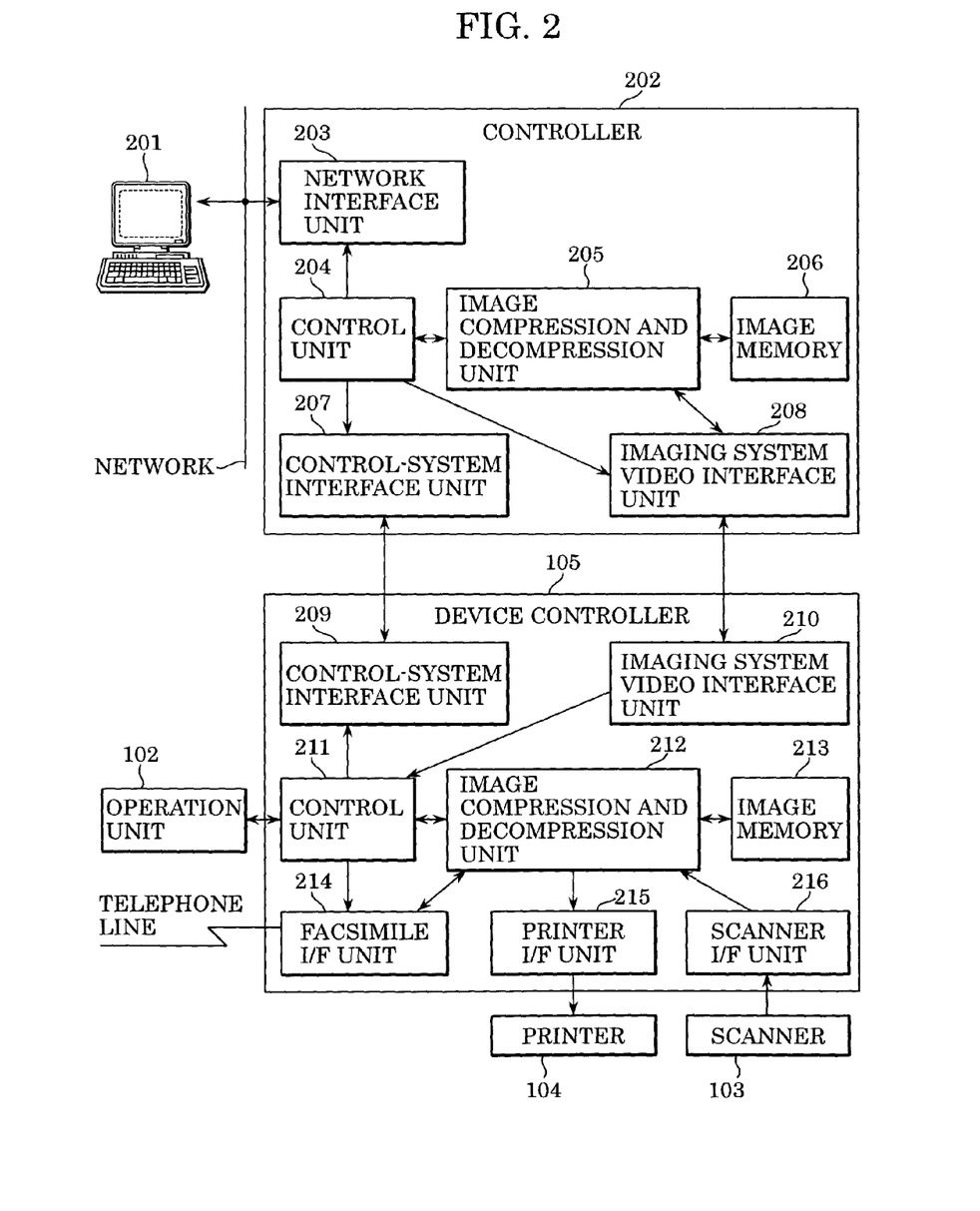
FIG. 2 is a block diagram of an image forming system according to an embodiment of the present invention.

According to a first embodiment of the present invention, a full-color multi-function digital copier (hereinafter simply referred to as a color copier) system is described in detail below. However, it should be noted that the present invention is not limited to this embodiment.
Description of Configuration FIG. 2 is a block diagram of an image forming system according to an embodiment of the present invention. As shown in FIG. 2, a client computer 201 is connected to a controller 202 via a network.

When carrying out printing from the client computer 201, a print job created by the client computer 201 is transmitted to the controller 202 via the network. In this embodiment, the print job consists of PDL data written in a page description language (PDL). A network interface unit 203 in the controller 202 receives the PDL data transmitted from the client computer 201. A control unit 204 then expands the PDL data into raster image data for each band. An image compression and decompression unit 205 then compresses the raster image data and stores it in an image memory 206. Subsequently, the control unit 204 sends a print instruction to a device controller 105 via a control-system interface unit 207. The image compression and decompression unit 205 decompresses the compressed image data read from the image memory 206. The decompressed image data is delivered to the device controller 105 via an imaging-system video interface unit 208 so as to form an image. Finally, the printer 104 prints the image. The print instruction passing through the control-system interface unit 207 includes a compression control parameter for controlling the compression in the device controller 105. The device controller 105 includes a control-system interface unit 209 for receiving a print instruction from the controller 202. The received instruction is processed by a control unit 211. The device controller 105 further includes an imaging-system video interface unit 210 for receiving image data delivered from the controller 202. The image data is compressed by a second image compression and decompression unit 212 based on the compression control parameter contained in the print instruction and is then stored in an image memory 213. Thereafter, in response to an instruction from the control unit 211, the compressed image data read from the image memory 213 is decompressed by the second image compression and decompression unit 212. The control unit 211 carries out a variety of image processing on the received image data and delivers it to the printer 104 via a printer interface (I/F) unit 215. Finally, the printer 104 prints the image.

According to the embodiment, the device controller 105 serves as a multi function peripheral (MFP) further having a scanner 103. That is, the device controller 105 has a scan function in which image data scanned by the scanner 103 is delivered to the controller 202. In this case, the image data scanned by the scanner 103 is delivered, via a scanner I/F unit 216, to the second image compression and decompression unit 212. The second image compression and decompression unit 212 compresses the image data and stores it in the image memory 213. Then, in response to an instruction sent to the controller 202 via the control-system interface unit 207, the second image compression and decompression unit 212 decompresses the compressed image data read out of the image memory 213 and delivers it to the controller 202 via the imaging-system video interface unit 208. The imaging-system video interface units 208 and 210 are video interfaces which carry raster image data in synchronization with an image clock. The image data is carried on eight signal lines, where eight-bit data per pixel are delivered. These eight signal lines are bi-directional. When carrying out printing, data is delivered from the controller 202 to the device controller 105. In contrast, when carrying out scanning, data is delivered from the device controller 105 to the controller 202.

In addition, according to the embodiment, the device controller 105 serves as a multi function peripheral (MFP) having a facsimile I/F unit 214. That is, the device controller 105 has a function that transmits an image scanned by the scanner 103 or an image received from the controller 202 to a telephone line via the facsimile I/F unit 214 and, conversely, receives facsimile image data from the telephone line to print it on the printer 104.

Figure 3:
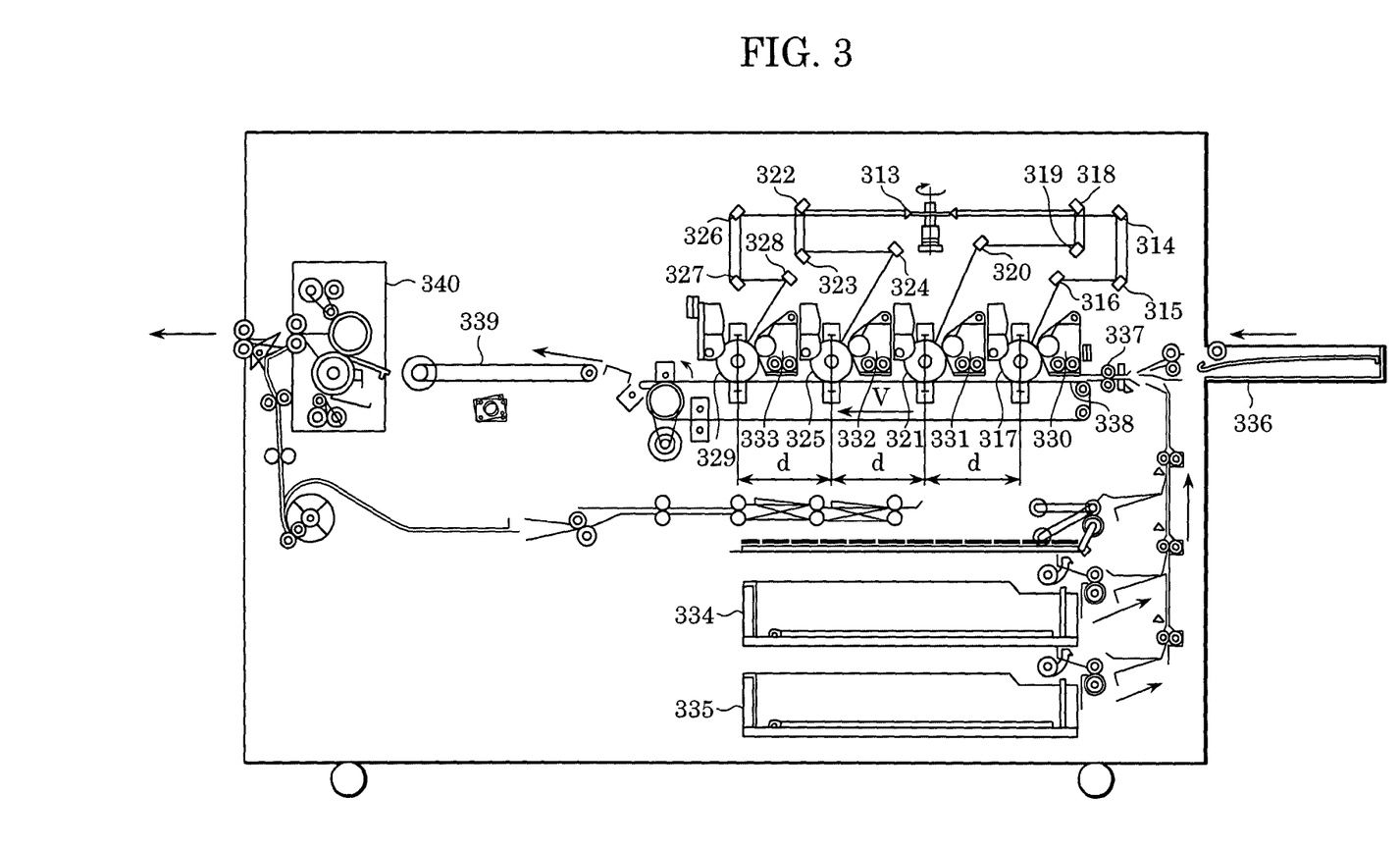
FIG. 3 is a diagram of a printer shown in FIG. 2.

An operation unit 102 is used for an operator to carry out various types of operations. For example, the operation unit 102 is used for an operator to configure network addresses required for the control-system interface units 207 and 209.
Scanner Configuration and Printer Configuration FIG. 3 is a diagram of the printer 104. As shown in FIG. 3, a polygon mirror 313 receives four laser beams emitted from four semiconductor lasers. One of the laser beams is scanned by a photoconductor drum 317 via mirrors 314, 315, and 316. Another laser beam is scanned by a photoconductor drum 321 via mirrors 318, 319, and 320. Another laser beam scan is scanned by a photoconductor drum 325 via mirrors 322, 323, and 324. The final laser beam is scanned by a photoconductor drum 329 via mirrors 326, 327, and 328.

A developer 330 supplies yellow (Y) toner and forms a yellow toner image on the photoconductor drum 317 in accordance with the laser beam. A developer 331 supplies magenta (M) toner and forms a magenta toner image on the photoconductor drum 321 in accordance with the laser beam. A developer 332 supplies cyan (C) toner and forms a cyan toner image on the photoconductor drum 325 in accordance with the laser beam. A developer 333 supplies black (K) toner and forms a black toner image on the photoconductor drum 329 in accordance with the laser beam. The four-color (Y, M, C, and K) toner images are transferred to a sheet of paper. As a result, a full-color output image is obtained.

A sheet fed from one of a sheet cassette 334, a sheet cassette 335, and a manual feed tray 336 passes through a resist roller 337. The sheet is then held and transported by a transfer belt 338. In synchronization with the paper feed, toner images of individual colors are developed on the photoconductor drums 317, 321, 325, and 329 in advance. The toner is transferred to the sheet of paper during transportation. The sheet on which the toner of each color is transferred is separated from the photoconductor drum and then is transported by a transport belt 339. The toner is fused to the sheet by a fuser 340. Once the sheet has passed through the fuser 340, it temporarily moves downward while being guided by a flapper. Once the trailing edge of the sheet has passed through the flapper, the sheet is switched back and is ejected. Thus, the sheet is ejected face down. Accordingly, the proper page sequence can be maintained when printing from the first page to the last page.

The four photoconductor drums 317, 321, 325, and 329 are evenly spaced by distance d from each other. The transfer belt 338 moves a sheet of paper at a constant speed v. In synchronization with this timing, the four semiconductor lasers are driven.

Image Processing of Device Controller

Figure 4:
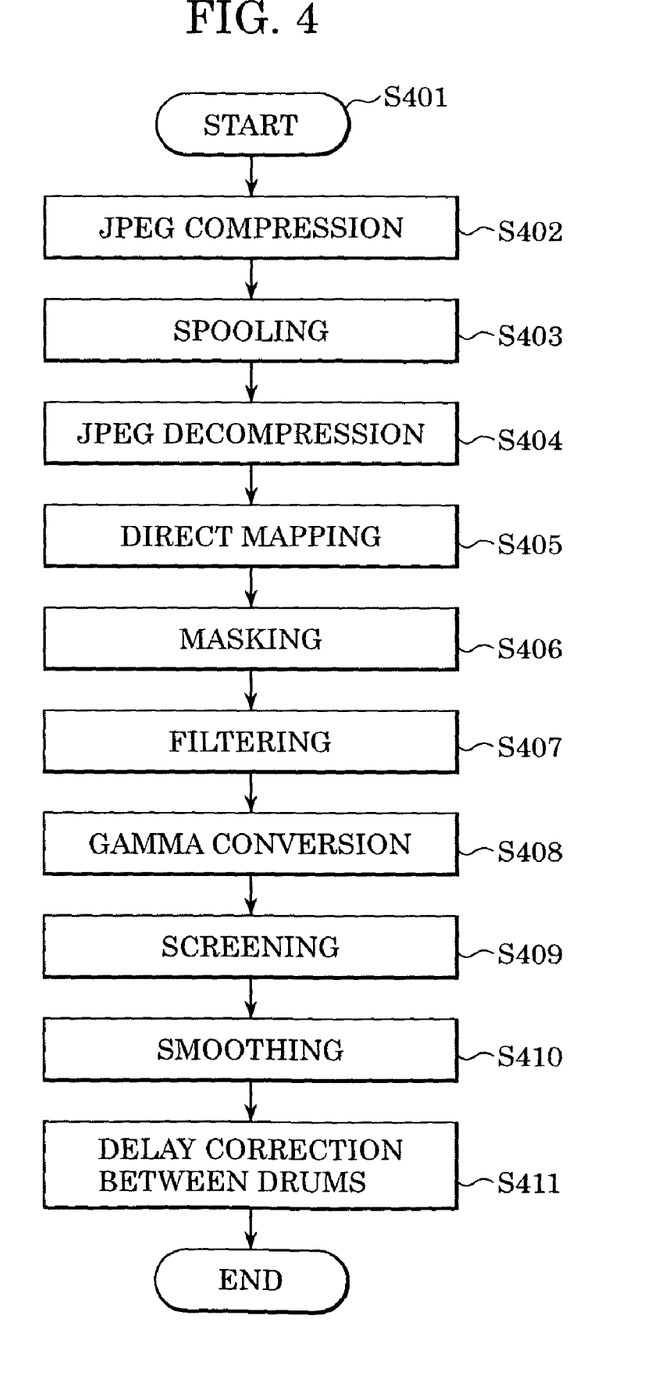
FIG. 4 is a flow chart of the image processing in a device controller.

The image processing carried out by the control unit 211 in the device controller is described next. FIG. 4 is a flow chart of the image processing. Here, only print processing of an image received from the controller 202 will be described. When, at step S401, the control-system interface unit 209 receives a print start command, the print processing starts. At step S402, a print job is delivered to the image memory 206 via the imaging-system video interface unit 210. The print job is compressed, e.g., JPEG-compressed, in the image memory 206 in accordance with specified compression parameters. At step S403, the compressed print job is spooled in the image memory 213. The print job may be spooled in a hard disk (not shown) depending on print circumstances. At step S404, after data for one page is spooled, the compressed print job in the image memory 213 is decompressed and the device controller 105 starts the printer 104. At step S405, color conversion is carried out by direct mapping. At step S406, after the color conversion, a masking operation is carried out. At step S407, after the masking operation, a filtering operation is carried out. At step S408, after the filtering operation, gamma conversion is carried out on the image data. At step S409, after the gamma conversion, a screening operation is carried out on the image data. At step S410, after the screening operation, a smoothing operation is carried out on the image data. At step S411, a balance correcting operation between individual drums is carried out on the image data. Finally, the image data processed by all the operations is delivered to the printer 104.

Installation of Device Link Profile

Figure 5:
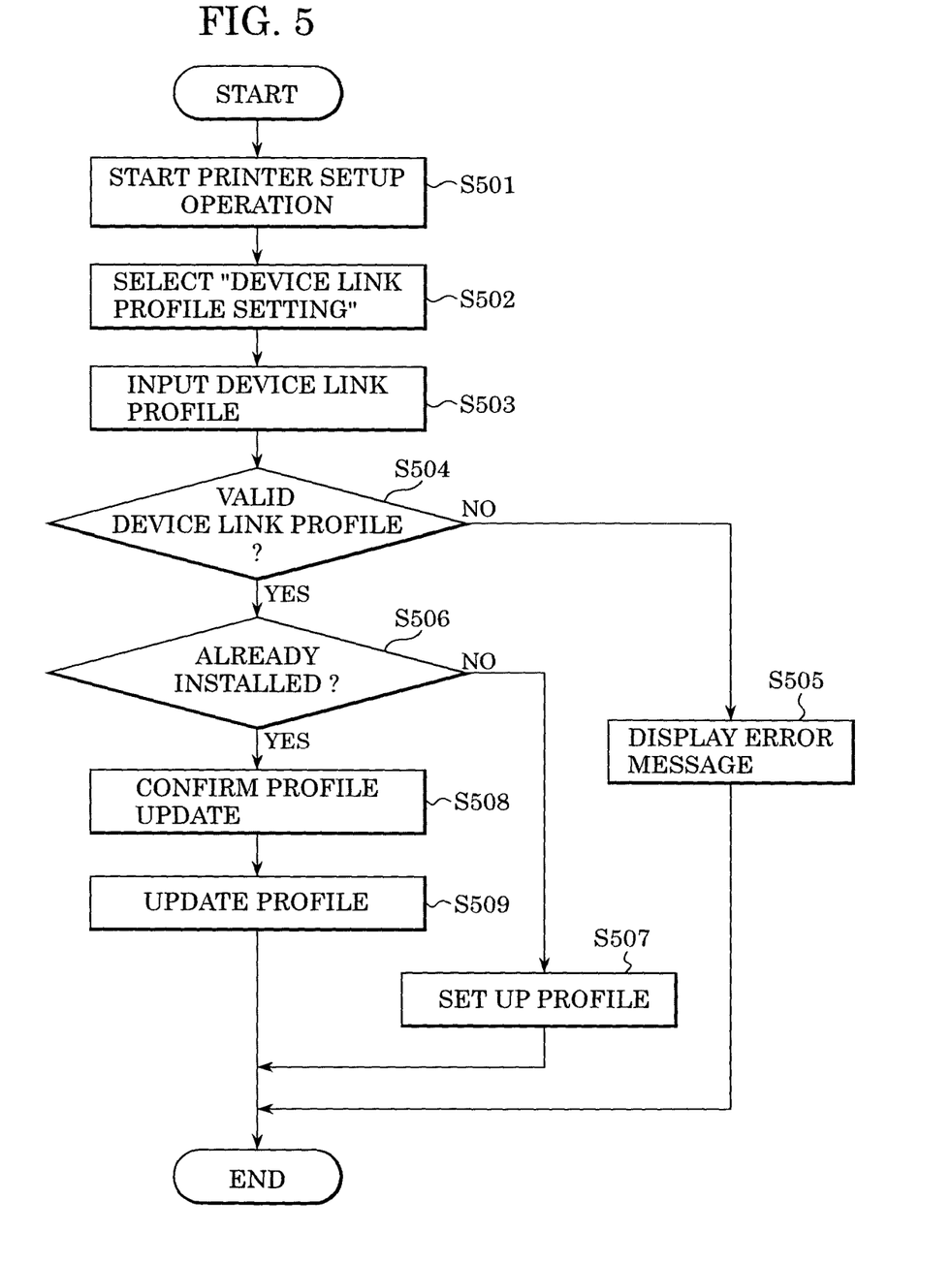
FIG. 5 is a flow chart illustrating the installation of a device link profile.
Figure 6:
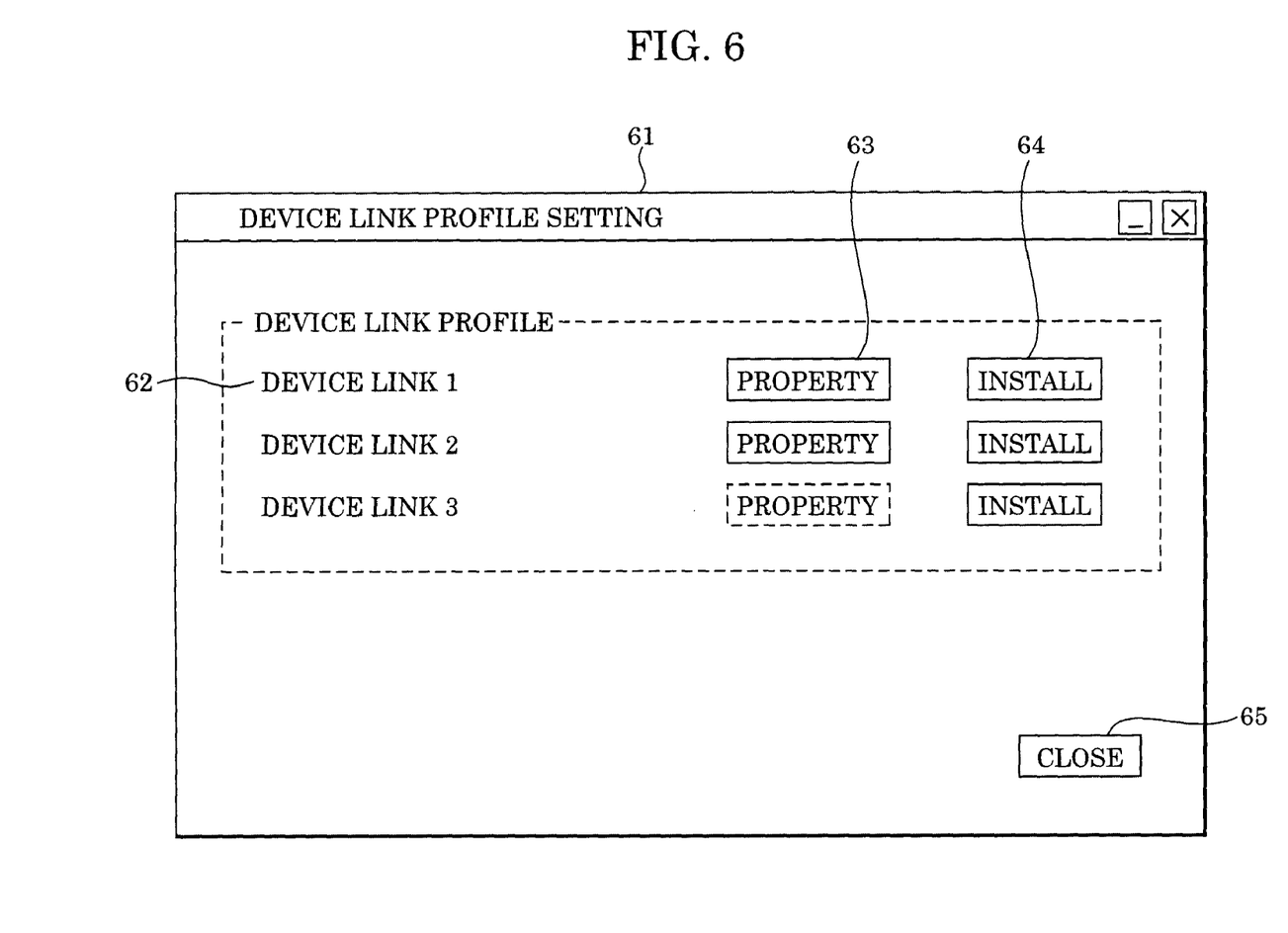
FIG. 6 shows a screen for setting up a device link profile.
Figure 7:
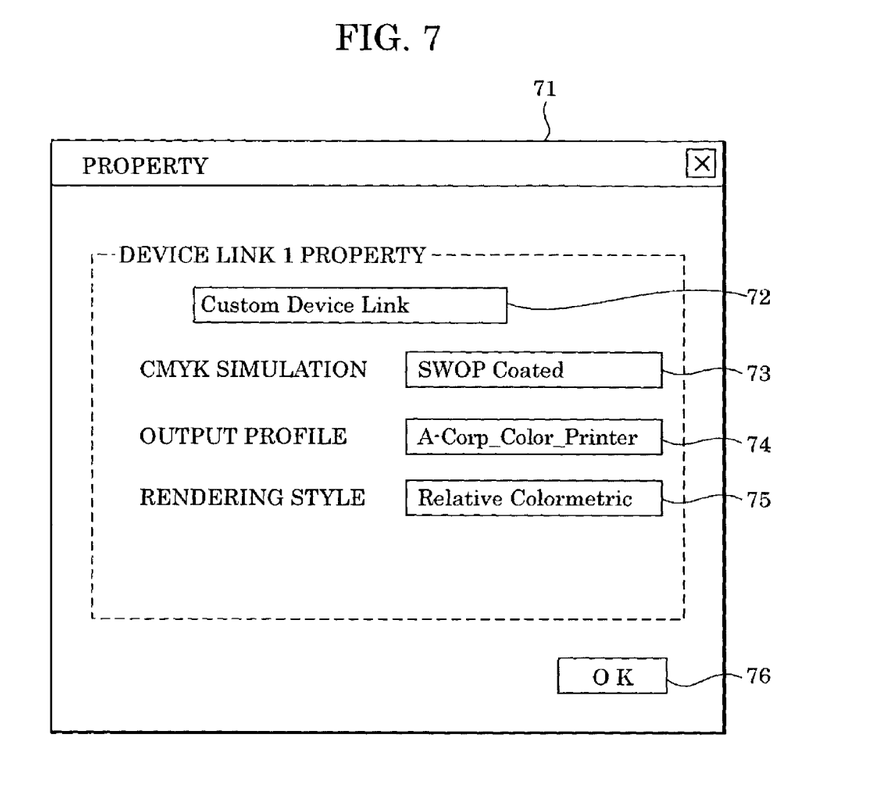
FIG. 7 shows a property display screen of the device link profile.

The case in which the controller 202 inputs a device link profile created by an external device to use it for printing is described next with reference to FIGS. 5, 6, and 7. In this case, since the color conversion can be carried out without using a profile connection space, the processing speed is higher compared to the case of using a source profile and an output profile. The external device may retrieve a source profile and an output profile required for creating a device link profile via a network. Alternatively, the external device may retrieve the source profile and output profile from a removable memory. FIGS. 6 and 7 show a profile selection screen and a property confirmation screen of a device for installing a device link profile in the controller 202. That is, these screens serve as a graphical user interface (GUI).

To allow a device link profile created by the external device to be used in printing, the device link profile must first be installed in the controller 202. FIG. 5 is a flow chart of the installation. The installation is carried out by the client computer 201 shown in FIG. 2 or another computer (not shown) connected to a network shown in FIG. 2. At step S501, a user starts a printer setup operation to set up the printer. The printer setup operation can be carried out via one of a driver and a print job management utility, both of which are installed in the client computer 201 or another computer (not shown), and a Web service of the controller 202. At step S502, the user selects a device link profile setting from menus (options) to display a setting screen. FIG. 6 shows a screen for setting up a device link profile. A device link profile field 62 in a setting window 61 indicates a setting option of device link profile alternatives. In this example, three device link profile alternatives, namely, "device link 1" to "device link 3" can be installed in the controller 202. By clicking a property button 63, properties of the desired device link profile are displayed, as described below with reference to FIG. 7. Buttons 64 and 65 function as an "install" button and a "close" button, respectively.

At step S503, the user selects the install button 64 to install a device link profile. Selecting the install button displays a file selection window (not shown) to allow the user to view a list of available device link profiles. Accordingly, the user can select a desired profile to be installed in the controller 202. The device link profiles include a profile whose input and output characteristics are customized by the user in various ways. Each profile determines an image processing method including a color conversion operation. After the user selects a desired profile and starts installation thereof, it is determined, at step S504, whether the selected profile is valid or not. If the profile is not valid, the process proceeds to step S505, where an error message is displayed and the installation of the profile is completed. If the profile is valid, the process proceeds to step S506, where it is determined whether the device profile link to be installed, which corresponds to one of the device link 1 to 3, has already been installed. If the device link profile is not installed, the device link profile is installed, at step S507, with predetermined print option setting values, and the process is completed. If the device link profile is already installed, processing proceeds to step S508 and it is confirmed whether the profile file is to be updated. At step S509, the device link profile is updated (if it was confirmed in step S508 that the profile file is to be updated). In the example shown in FIG. 6, when a device link profile is installed, the property button 63 is enabled (e.g., the button is not grayed out) so that a user can select the installed profile. In contrast, when a device link profile is not installed, the property button 63 is disabled (e.g., grayed out), and therefore, a user cannot select the profile. That is, in FIG. 6, a device link profile has already been installed in each of "device link 1" and "device link 2", which each correspond to a predetermined memory area of the controller 202. However, a device link profile has not yet been installed in a memory area corresponding to "device link 3".

Properties of Device Link Profile

The properties display screen of a device link profile is described next with reference to FIG. 7. The display screen of properties includes a property window 71, property information fields 72, 73, 74, and 75, and a close (OK) button 76. Tag information in a device link profile is displayed in each property information field as described next. A device link profile field 72, which indicates the name of the device link profile installed as a device link 1, displays the value of "profile Description Tag" in the device link profile. A CMYK simulation field 73, which indicates the type of source profile used to create the currently displayed device link profile, displays a value in "profile SequenceDescType" defined in the device link profile. An output profile field 74, which indicates the type of output profile used to create the currently displayed device link profile, displays a value in "profile Sequence-DescType" defined in the device link profile. A rendering style field 75, which indicates the rendering intent (rendering style) used to create the currently displayed device link profile, displays "Intent" defined in the device link profile. A user cannot always tell what source profile, what output profile, and what rendering intent a device link profile consists of simply from the name. By viewing these properties, the user can confirm the profile of the device link profile. In FIG. 7, a source profile (CMYK simulation profile) is "SWOP Coated".

Printing Based on Device Link Profile

Figure 8:
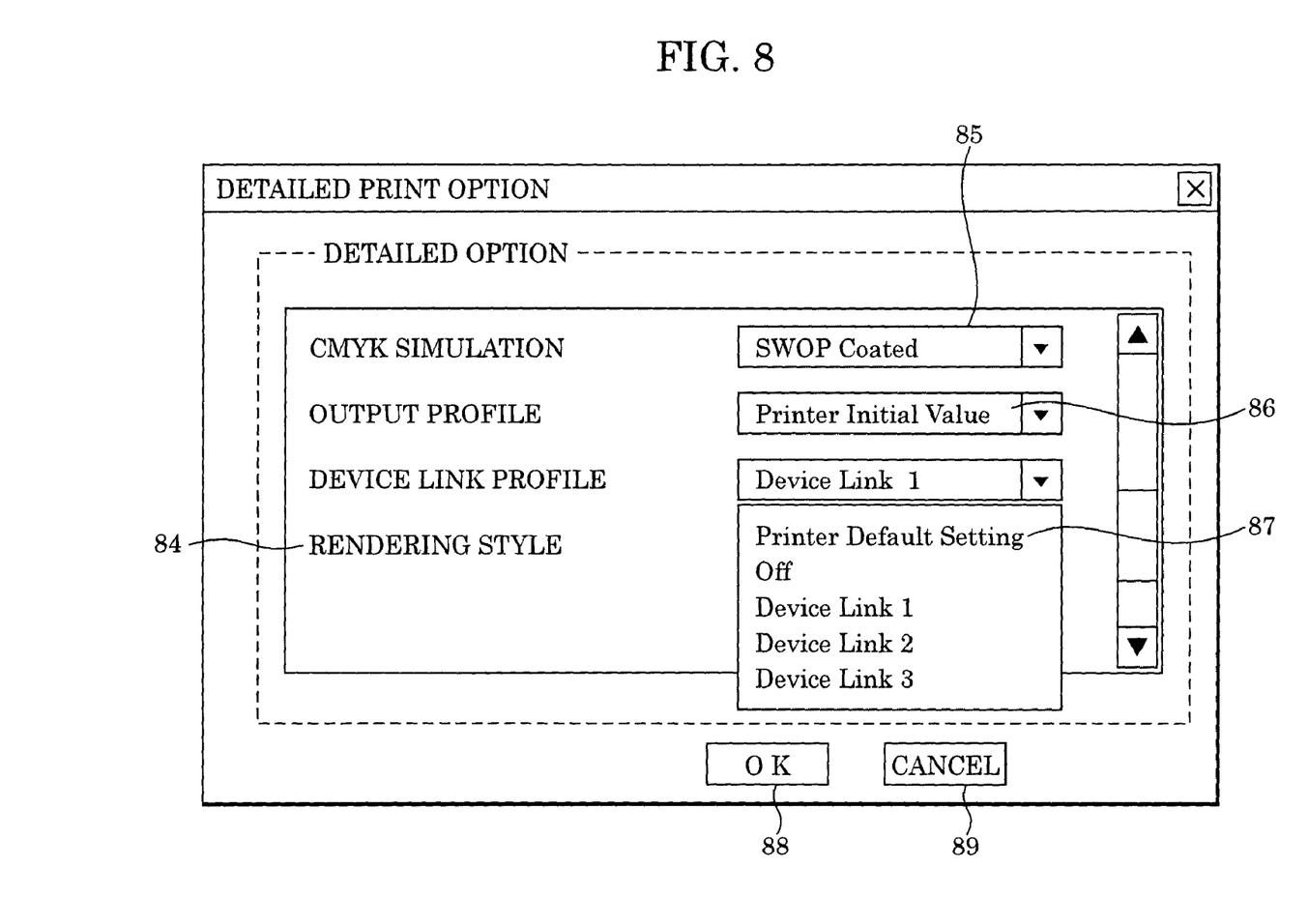
FIG. 8 shows detailed print options of a print driver using a device link profile.

The procedure for a user to carry out printing from the client computer 201 based on the desired device link profile is described next with reference to FIG. 8. FIG. 8 shows detailed print options of a print driver displayed on a monitor of the client computer 201. A user can set up these detailed print options via a user interface of the client computer 201. A user can set up a source profile of CMYK simulation to "SWOP Coated", "Euroscale", etc., by using a CMYK simulation pull-down menu 85. By using an output profile pull-down menu 86, a user can set up an output profile in accordance with the output characteristic of a printer. The "printer default value" can be selected for the output profile. The "printer default value" is prepared for each type of print paper (medium). A device link profile pull-down menu 87 is used for setting up a device link profile. By using the device link profile pull-down menu 87, a user can select one of a "printer default setting", "off", "device link 1", "device link 2", and "device link 3". Also, an OK button 88 and a cancel button 89 are provided. Furthermore, a pull-down menu (not shown) used for setting up a rendering style 84 is provided. By using this pull-down menu, a user can select a rendering style, such as "calorimetric", "saturation", and "perceptual" when carrying out color conversion using the CMYK simulation profile and the output profile selected by the CMYK simulation pull-down menu 85 and the output profile pull-down menu 86, respectively.

When the device link profile is set to a value other than "off", a print job is color-converted and printed using the device link profile. If a user accidentally selects, by using the pull-down menu, one among "device link 1", "device link 2", and "device link 3" in which a device link profile is not installed, a print error message is displayed. Alternatively, a check may be performed to determine which device link profiles are installed and the device link profile pull-down menu 87 may only allow a user to select an available device link profile. For example, if a profile for "device link 1" is installed, but profiles for "device link 2" and "device link 3" are not installed, the device link profile pull-down menu 87 may not display options for "device link 2" and "device link 3", or the options for "device link 2" and "device link 3" may be displayed, but disabled (e.g., grayed out). Additionally, the detailed print option setting does not allow a user to set up a device link profile, CMYK simulation, and an output profile for a driver at the same time. That is, when the device link profile is set up to a value other than "off", CMYK simulation (source profile), an output profile, and rendering style are grayed out, and only "off" is enabled. In this case, a print job transmitted to the controller is color-converted using the setup device link profile without using PCS (profile connection space). Accordingly, a color process (conversion) using resources specified by another source profile, another output profile, and another rendering intent is not used. That is, in the detailed print option setting shown in FIG. 8, a set of a source profile, an output profile, and a rendering style and the above-described device link profile are displayed such that a user exclusively selects one of the set and the above-described device link. By selecting a profile displayed in the detailed print option setting, the image processing including color conversion is switched from one to another.

Additionally, by selecting one of the displayed text "profile 1", "profile 2", and "profile 3" and then by carrying out a predetermined operation (e.g., by right-clicking a mouse (not shown) of the client computer 201), a user can view the properties of the selected device link profile. If the selected device link profile is not a desired one, the user selects one of the displayed profiles again. When a large number of device link profiles are prepared, a predetermined operation, such as double-clicking, on the displayed text "device link profile" displays a user interface to search for a profile. By selecting a source profile, an output profile, or both to be displayed on the user interface, only device link profiles created by using the selected source profile or output profile are displayed in the pull-down menu 87. As a result, the user can easily find the desired device link profile.

Second Embodiment

In the first embodiment, an example is described in which a device link profile created by an external device is installed in the controller and a print driver carries out printing. In the second embodiment, color profile management by a utility called a color manager and the extended function of the printer driver for using a color profile are described next. The color manager manages a color process and calibration installed in the controller 202 or another computer connected to the network shown in FIG. 2.

Figure 9:
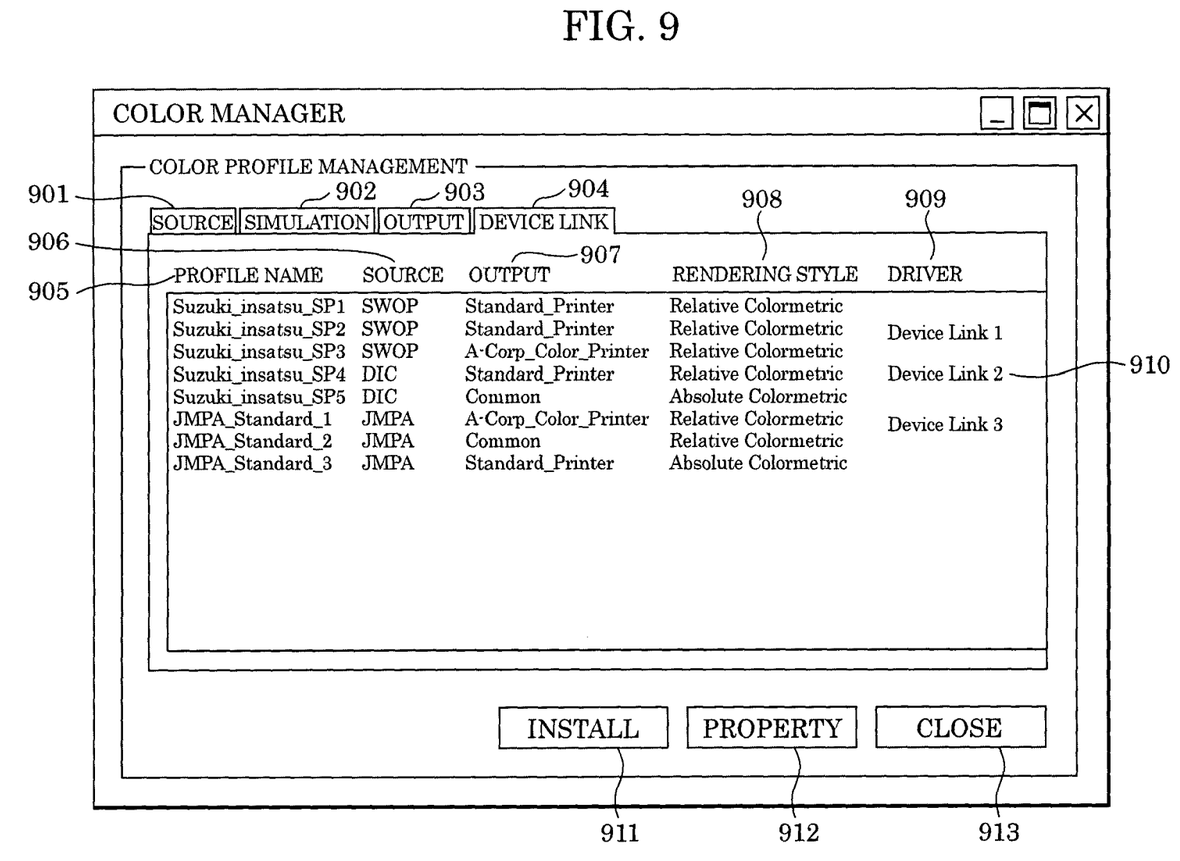
FIG. 9 shows a color-profile management screen according to another embodiment of the present invention.

FIG. 9 shows the color-profile management screen of the color manager. A source profile, a simulation profile, an output profile, and a device link profile can be managed via the exemplary color-profile management screen shown in FIG. 9. The displays of these profiles can be switched by selecting tabs 901, 902, 903, and 904. When a user wants to manipulate a device link profile, the user selects the device link tab 904, as shown in FIG. 9. Selecting the device link tab 904 displays a list of device link profiles installed in the controller 202. Information is displayed in fields of the list based on tag information in a device link profile. In a profile name field 905, the name of a device link profile is displayed. The name of a device link profile file is a value in "profile Description Tag" of the device link profile. In a source field 906, the type of a source profile used for creating the device link profile is displayed. The type of a source profile is a value in "profile SequenceDescType" of the device link profile. In an output field 907, the type of an output profile used for creating the device link profile is displayed. The type of an output profile is also a value in "profile SequenceDescType" of the device link profile. In a rendering style field 908, the rendering intent used for creating the device link profile is displayed. The rendering intent is a value in "Intent" of the device link profile. By viewing information displayed in a driver field 909, a user can identify a device link profile assigned to each device link 1, 2, or 3 in the default setting. In this embodiment, Suzuki_insatsu_SP2 is assigned to the device link 1, Suzuki_insatsu_SP4 is assigned to the device link 2, and JMPA_Standard_2 is assigned to the device link 3.

By clicking an install button 911, a user can install a device link profile in the controller. The result is displayed in the profile management list. The user selects a device link profile in the profile management list via a user interface and depresses a property button to display the detailed information of the selected device link profile. After viewing the displayed screen, the user can change a profile used by the driver by selecting an item in the list, e.g., the item for Suzuki_ insatsu_SP4 910 and depressing a property button 912. The color-profile management screen also provides a close button 913.

Figure 10:
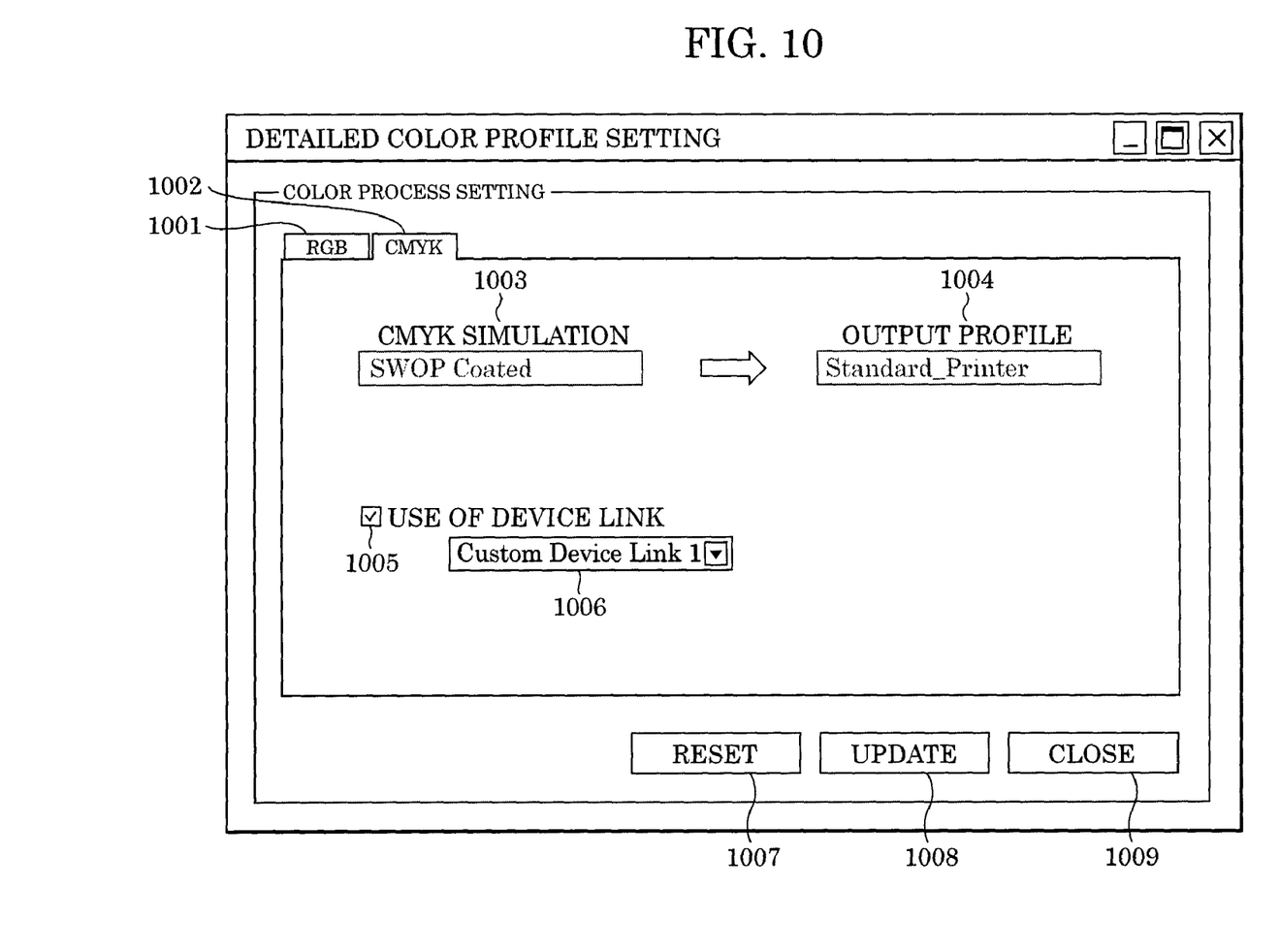
FIG. 10 shows a screen for setting up the details of a color profile according to the embodiment.

The extended function for the printer driver installed in the controller 202 or another computer connected to the network to use a color profile is described next with reference to FIG. 10. In this function, a color profile is not switched via a normal print option, but via a detailed color profile setting window displayed by the printer driver in response to the user depressing a detailed color profile setting button (not shown) of the printer driver. The detailed color profile setting is carried out using bi-directional communication between the client computer 201 and the controller 202. This configuration allows the printer driver to use all of the color profiles installed in the controller 202, thus increasing the usability.

Switching tabs 1001 and 1002 in a setting screen are used for switching from a profile for an RGB input image using RGB tab 1001 to a profile for a CMYK input image using CMYK tab 1002 and vice versa. In FIG. 10, a CMYK profile is selected. A user selects and sets the CMYK simulation on a CMYK selection menu 1003. Similarly, the user selects and sets an output profile on an output profile selection menu 1004. The user can input an instruction as to whether a device link profile is used or not via a device link usage check box 1005. Upon checking the device link usage check box 1005, the user can select and set a device link profile via a device link profile selection menu 1006. When a user depresses a reset button 1007, fields of the selection menus 1003, 1004, and 1006 are initialized. Depressing an update button 1008 enables the names of profiles installed in the controller 202 to be displayed in the selection menus by carrying out bi-directional communication with the printer whenever possible. Thus, the user can use all of the installed color profiles. The setting screen also provides a close button 1009.

To use a device link profile, the user turns on (checks) the device link usage check box 1005 and then selects a desired device link profile using the device link selection menu 1006. When the user turns on the device link usage check box 1005 in order to use the device link profile, the CMYK simulation selection menu 1003 and output profile selection menu 1004 are automatically grayed out and are disabled, and therefore, the user cannot select the menus.

As described above, according to the embodiment, the image processing apparatus analyzes a print job written in a page description language so as to expand the print job into a raster image. While expanding the print job, the image processing apparatus carries out color processing using a color profile. The color profile includes not only a set of a standard source profile and a output profile (hereinafter simply referred to as a color profile) used for color conversion via PCS, which is a color space independent from input and output devices, but also a device link profile used for a direct color conversion from an input color space to an output color space without using the PCS. This configuration provides a function to install a plurality of color profiles or a plurality of device link profiles created outside the image processing apparatus via a local medium or a network, thus providing color conversion using pre-installed color profiles and device link profiles or post-installed color profiles and device link profiles. Also, in this configuration, only color profiles or device link profiles are used at one time. Therefore, users can input and use a plurality of externally created device link profiles without experiencing accidental setting errors.

Since a color profile and a device link profile are not used at the same time, a color conversion process using a source profile and an output profile and another color conversion process using only a device link profile do not work at the same time. Accordingly, the system does not become complicated. As a result, stable color conversion is advantageously achieved.

Furthermore, when a color profile and a device link profile are exclusively used, the image processing apparatus selects a color processing method including color conversion in accordance with a used profile. This almost completely prevents interaction between image processes using the color profile and using the device link profile. As a result, more stable color conversion is advantageously achieved.

In addition, the image processing apparatus has GUI operation screens for a user to select an image processing function including an operation screen for selecting an installed color profile or a device link profile, an operation screen for disabling the selection of device link profile when a color profile is selected, and an operation screen for disabling the selection of color profile when a device link profile is selected. Consequently, the displays on the operation screens can be synchronized with internal modules one of which works at one time. As a result, user-friendly operation screens can be advantageously provided for users.

Furthermore, the image processing apparatus has GUI operation screens that permit the selection of functions only for a color profile or a device link profile in accordance with the selection of the color profile or the device link profile. Accordingly, among color processing options which can be selected after a color profile is selected, options not related to the selected color profile can be disabled. As a result, a simplified operation that prevents user operation errors can be advantageously provided.

Still furthermore, according to the second embodiment, this configuration of the apparatus provides a UI (user interface) that displays the profile description, the rendering intent, the source profile name, and the destination profile name, all of which are information written in tags of a device link profile when the device link profile is created. Accordingly, users can check more detailed information about the device link profile, which tends to be significantly affected by the conditions when the device link profile is created. As a result, the UI advantageously helps users select an appropriate device link profile while reducing user operation errors. That is, the apparatus can provide the users with a user-friendly selection unit.

Other Embodiments

Additionally, although the above-described embodiments include hardware in a network, the embodiments can be achieved by software that sequentially executes each data processing. That is, it is apparent that the present invention can be achieved by supplying a storage medium or a recording medium storing program code of software that achieves the functions of the above-described embodiments to a system or a device and by causing a computer (CPU (central processing unit) or MPU (micro-processing unit)) of the system or device to input and execute the program stored in the recording medium. In such a case, the program code itself of the software achieves the functions of the above-described embodiments. The recording medium storing the program code includes, for example, a CD (compact disk), an MD (Mini Disk), a memory card, and an MO (magneto optical disk).

Furthermore, in addition to achieving the functions of the above-described embodiments by the computer executing the readout program, the functions of the above-described embodiments can be achieved by a process in which an OS (operating system) running on the computer executes some of or all of the effective functions in response to instructions of the program.

Still furthermore, the functions of the above-described embodiments can be achieved by a process in which, after a program read from a recording medium is stored in a memory of an add-on expansion board inserted in a computer or a memory of an add-on expansion unit connected to a computer, a CPU in the add-on expansion board or in the add-on expansion unit executes some of or all of the functions in the above-described embodiments.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-153371 filed May 24, 2004, which is hereby incorporated by reference herein.

What is claimed is:

1. An image processing apparatus comprising:
   a display unit configured to display names of device link profiles for selecting of a device link profile for a print job;
   an instruction unit configured to instruct a display of properties of the device link profile displayed by the display unit;
   a property display unit configured to display the properties in response to the instruction of the instruction unit;
   a selecting unit configured to select at least one of a source profile and an output profile; and
   a device link profile search unit configured to search for a device link profile created by at least one of a source profile and an output profile selected by the selecting unit,
   wherein the instruction unit is configured to instruct the display of properties such that when one of the device link profiles is selected for the display of the properties while performing a print setting, properties of the selected device link profile are displayed, and
   wherein the displayed properties of the device link profile include at least information of a source profile and information of an output profile used when the selected device link profile is created.

2. The image processing apparatus according to claim 1, wherein the properties displayed in accordance with the instruction from the instruction unit include a rendering style used when the device link profile is created.

3. A method for controlling a display of an image processing apparatus, the method comprising steps of:
   displaying, on the display of the image processing apparatus, names of device link profiles for selecting of a device link profile for a print job;
   instructing a display of properties of the device link profile displayed;
   displaying, on the display of the image processing apparatus, the properties in response to the instruction of instructing the display of properties;
   selecting at least one of a source profile and an output profile; and
   searching for a device link profile created by the selected at least one source profile and output profile,
   wherein the display of properties is instructed such that when one of the device link profiles is selected for the display of the properties while performing a print setting, properties of the device link profile are displayed, and
   wherein the displayed properties of the device link profile include at least information of a source profile and information of an output profile used when the selected device link profile is created.

4. A non-transitory computer-readable medium having stored thereon a program for controlling a display of an image processing apparatus, the computer-readable medium comprising program code for performing the method according to claim 3.

* * * * *